United States Patent [19]

Staplin et al.

[11] Patent Number: 5,073,855
[45] Date of Patent: Dec. 17, 1991

[54] RESOURCE CONFLICT DETECTION METHOD AND APPARATUS INCLUDED IN A PIPELINED PROCESSING UNIT

[75] Inventors: Deborah K. Staplin, Chelmsford; Jian-Kuo Shen, Belmont; Ming-Tzer Miu, Chelmsford, all of Mass.

[73] Assignee: Bull HN Information Systems Inc., Billerica, Mass.

[21] Appl. No.: 374,882

[22] Filed: Jun. 30, 1989

[51] Int. Cl.$^5$ .................................................. G06F 9/38
[52] U.S. Cl. .................................. 395/375; 364/231.9; 364/262.8; 364/263; 364/281.6; 364/281.8; 364/DIG. 1
[58] Field of Search ........................................... 364/200, 900

[56] References Cited

U.S. PATENT DOCUMENTS

| | | | |
|---|---|---|---|
| 4,493,020 | 1/1985 | Kim et al. | 364/200 |
| 4,638,429 | 1/1987 | Watabe et al. | 364/200 |
| 4,760,519 | 7/1988 | Papworth et al. | 364/200 |
| 4,789,925 | 12/1988 | Lahti | 364/200 |
| 4,831,515 | 5/1989 | Kamada et al. | 364/200 |
| 4,928,226 | 5/1990 | Kamada et al. | 364/200 |
| 4,969,117 | 11/1990 | Miranker | 364/200 |

Primary Examiner—Gareth D. Shaw
Assistant Examiner—John C. Loomis
Attorney, Agent, or Firm—Faith F. Driscoll; John S. Solakian

[57] ABSTRACT

A pipelined processing unit includes an instruction unit stage containing resource conflict apparatus for detecting and resolving conflicts in the use of register and indicator resources during the different phases of instruction execution. The instruction unit includes a plurality of resource registers corresponding in number to the number of instructions which can be processed concurrently by the processing unit. Decode circuits in response to each new instruction received by the instruction unit generate one or more sets of bit indication signals designating those resources required by the specific pipeline stage(s) executing the instruction for completing the execution of the instruction which are shared by those stages capable of completing the execution of instructions. Comparison circuits compare the set of bit indication signals for each new instruction that corresponds to resources needed by an earlier pipeline stage which in the preferred embodiment corresponds to a secondary execution unit, with the stored sets of bit indication signals for determining the presence of any resource conflict.

20 Claims, 5 Drawing Sheets

| INSTRUCTION | MNEMONIC | EXEC. UNIT |
|---|---|---|
| 9800 0000 0014 | LDR $R1, MEMVAL1 | E |
| A800 0000 0016 | LDR $R2, MEMVAL2 | E |
| 9A70 0008 | ADD $R1, •8 | A |
| B804 | LDR $R3, MEMVAL3 | E |
| 9A31 | ADD $R1, $B1.$R3 | E |
| B070 | SUB $R3, •1 | A |
| 0455 | BOV OVERFLOW | A |

Fig. 4a.

| | | |
|---|---|---|
| RSRC0 | 0040 0000 | ← EDONEPTR |
| RSRC1 | 0000 0000 | ← EOUTPTR |
| RSRC2 | 0000 0000 | |
| RSRC3 | 0000 0000 | |

Fig. 4b.

| | | |
|---|---|---|
| RSRC0 | 0040 0000 | ← EDONEPTR |
| RSRC1 | 0020 0000 | |
| RSRC2 | 0000 0000 | ← EOUTPTR |
| RSRC3 | 0000 0000 | |

Fig. 4c.

| | | |
|---|---|---|
| RSRC0 | 0000 0000 | |
| RSRC1 | 0020 0000 | ← EDONEPTR |
| RSRC2 | 0000 0000 | ← EOUTPTR |
| RSRC3 | 0000 0000 | |

Fig. 4d.

| | | |
|---|---|---|
| RSRC0 | 0000 0000 | |
| RSRC1 | 0000 0000 | |
| RSRC2 | 0010 0000 | ← EDONEPTR |
| RSRC3 | 0000 0000 | ← EOUTPTR |

Fig. 4e.

| | | |
|---|---|---|
| RSRC0 | 0000 0000 | ← EOUTPTR |
| RSRC1 | 0000 0000 | |
| RSRC2 | 0000 0000 | |
| RSRC3 | 0040 0060 | ← EDONEPTR |

Fig. 4f.

RESOURCE CONFLICT DETECTION METHOD AND APPARATUS INCLUDED IN A PIPELINED PROCESSING UNIT

RELATED APPLICATIONS

1. The patent application of Ming-Tzer Miu and Thomas F. Joyce entitled, "Production Line Method and Apparatus for High Performance Instruction Execution," filed on Dec. 19, 1988, bearing Ser. No. 07/286,580, which is assigned to the same assignee as this patent application.
2. The patent application of David E. Cushing, Romeo Kharileh, Jian-Kuo Shen and Ming-Tzer Miu entitled, "Dual Port Read/Write Register File Memory," filed on Dec. 19, 1988, bearing Ser. No. 07/286,552, which is assigned to the same assignee as this patent application.
3. The patent application of Jian-Kuo Shen, Richard P. Kelly, Robert V. Ledoux and Deborah K. Staplin entitled, "Control Store Addressing from Multiple Sources," filed on Dec. 19, 1988, bearing Ser. No. 07/286,578, which is assigned to the same assignee as this patent application.
4. The patent application of Richard P. Kelly, Jian-Kuo Shen, Robert V. Ledoux and Chester M. Nibby, Jr. entitled, "Control Store Double Pump Operation," filed on Dec. 19, 1988, bearing Ser. No. 07/286,581, which is assigned to the same assignee as this patent application.
5. The patent application of Richard P. Kelly and Robert V. Ledoux entitled, "Control Store Address Generator for Developing Unique Instruction Execution Starting Address," filed on Dec. 19, 1988, bearing Ser. No. 07/286,582, which is assigned to the same assignee as this application.
6. The patent application of David E. Cushing, Richard P. Kelly, Robert V. Ledoux and Jian-Kuo Shen entitled, "Mechanism for Automatically Updating Multiple Unit Register File Memories in Successive Cycles for a Pipelined Processing System," filed on Dec. 19, 1988, bearing Ser. No. 07/286,551, which is assigned to the same assignee as this application.
7. The patent application of Richard P. Kelly and Robert V. Ledoux entitled, "Automatic Data Steering Mechanism for Alignment of Operands into and out of an Execution Unit," filed on Mar. 31, 1989, bearing Ser. No. 07/331,991, which is assigned to the same assignee as this application.
8. The patent application of Robert V. Ledoux, Richard P. Kelly and Forrest M. Philips entitled, "Ring Reduction Logic Mechanism," filed on Mar. 31, 1989, bearing Ser. No. 07/332,258, which is assigned to the same assignee as this application.
9. The patent application of Deborah K. Staplin and Jian-Kuo Shen entitled, "Instruction Unit Logic Management Apparatus Included in a Pipelined Processing Unit," filed on June 30, 1989, bearing Ser. No. 07/374,881, which is assigned to the same assignee as this application.

BACKGROUND OF THE INVENTION

1. Field of Use

This invention relates to pipelined data processing systems and more particularly to apparatus for resolving resource conflicts within such systems.

2. Prior Art

Many techniques have been developed in order to improve the performance of high performance systems. These have involved the development of socalled pipelined processors which process instructions stored in cache memories in such a manner that more than one instruction is actually being processed at any one given time. In such a system, one instruction might be completed within a given machine cycle at the same time as another instruction had only been partially completed.

While such systems achieve high performance, instructions are placed serially into the pipeline and as soon as the stage has completed its operation, the instruction is passed onto the next processing stage. Therefore, instructions are executed in the order in which they enter the pipeline. In order to improve system performance, some systems overlap the operations being executed by certain stages within the pipeline. An example of this type of system is described in U.S. Pat. No. 4,760,519.

While the above improves performance, instructions are still required to be executed in the order in which they are introduced into the pipeline. The performance of a pipelined system has been improved by having the processing unit operate in a production line fashion in which earlier stages are able to complete the execution of certain types of instructions ahead of earlier introduced instructions. This processing unit is subject of related copending application titled "Production Line Method and Apparatus for High Performance Instruction Execution."

While pipelined processing units provide high performance, their performance still depends greatly on the order of the instructions in the instruction stream. That is, if consecutive instructions have data and control dependencies and contend for resources, then "holes" in the pipeline or production line will develop and performance will suffer.

To improve performance, in certain systems it may be possible to arrange the code or schedule it so that dependencies and resource conflicts are minimized. Registers can also be allocated so that register conflicts are reduced. However, register conflicts caused by data dependencies cannot be eliminated in this fashion. The problem of resource conflicts becomes even more important in the case of the production type processing unit in that any halt in operation will greatly affect performance.

Accordingly, it is a primary object of the present invention to provide method and apparatus for detecting resource conflicts which permits high performance pipeline operation.

It is another object of the present invention to provide a method and apparatus which maximizes operation and requires a minimum of complexity.

SUMMARY OF THE INVENTION

The above and other objects of the present invention are achieved in a preferred embodiment of a pipelined processing unit which includes an instruction unit stage containing resource conflict apparatus for detecting and resolving conflicts in the use of register and indicator resources during the different phases of instruction execution. The instruction unit includes a plurality of resource registers corresponding in number to the number of instructions which can be processed concurrently by the processing unit. Decode circuits in response to each new instruction received by the instruction unit generate one or more sets of bit indication signals designating those resources required by the specific pipeline stage(s) executing the instruction for completing the execution of the instruction which are shared by those stages capable of completing the execution of instructions.

For a given instruction, there will be one set of bit indication signals generated for each pipeline stage that can complete the execution of that instruction. For each instruction executable by a last pipeline stage which corresponds to the main or primary execution unit in the preferred embodiment, the set of bit indication signals corresponding to that last pipeline stage is stored in a next available one of the resource registers. Comparison circuits compare the set of bit indication signals for each new instruction that corresponds to resources needed by an earlier pipeline stage which in the preferred embodiment corresponds to a secondary execution unit, with the stored sets of bit indication signals for determining the presence of any resource conflict. When the comparison circuits detect a match between the set of bit indication signals and another set of stored bit indication signals, an output lock signal is generated which signals a resource conflict. The lock signal causes the instruction unit to stall its operation inhibiting the instruction which produced the conflict from entering the pipeline until there is no longer a conflict.

According to preferred embodiment, as the primary execution unit completes the execution of each instruction, it sends back a done signal to the instruction unit. This enables the instruction unit to clear the set of bit indication signals stored in the corresponding one of the resource registers. If this action removes the resource conflict, the comparison circuits turn off the lock signal and the instruction is permitted to enter the pipeline.

By determining which register and indicator resources are shared by the primary and secondary execution units and allowing instructions to enter the pipeline for execution out of sequence as long as there is not a resource conflict, the high performance of the processing unit is maintained.

In the preferred embodiment, the primary and secondary execution units, each include register file storage which contain the software visible registers utilized by the processing unit. Only those registers which are shared by the execution units in executing instructions will be signaled as potential conflicts. In the preferred embodiment, the primary execution unit includes several execution units, each of which executes a different subset of the instruction set. These correspond to commercial, scientific and general instructions. Only those indicators which can create potential conflicts and shared by the earlier and last stages are included as resources within the set of bit indicator signals. Any resource which is only used by instructions for which pipeline operation can not proceed (also called complex instructions), is excluded. In the case of certain types of scientific instructions, several indicators are consolidated into a single indicator for detecting conflicts for those types of scientific instructions in which pipeline operation can proceed. To facilitate the detection of conflicts, the indicator resources are divided into different classes as a function of instruction type and executing unit. Also, the arrangement reduces substantially, circuit complexities. Since in the preferred embodiment, the instruction unit and execution units are constructed from separate integrated circuit chips, such reductions in complexity are most important in terms of performance, cost, testability, and reliability.

The novel features which are believed to be characteristic of the invention, both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

DESCRIPTION OF THE DRAWINGS

FIGS. 2a through 2c show in greater detail, the different units of FIG. 1.

DESCRIPTION OF THE PREFERRED EMBODIMENT

System Organization

Figure 1:
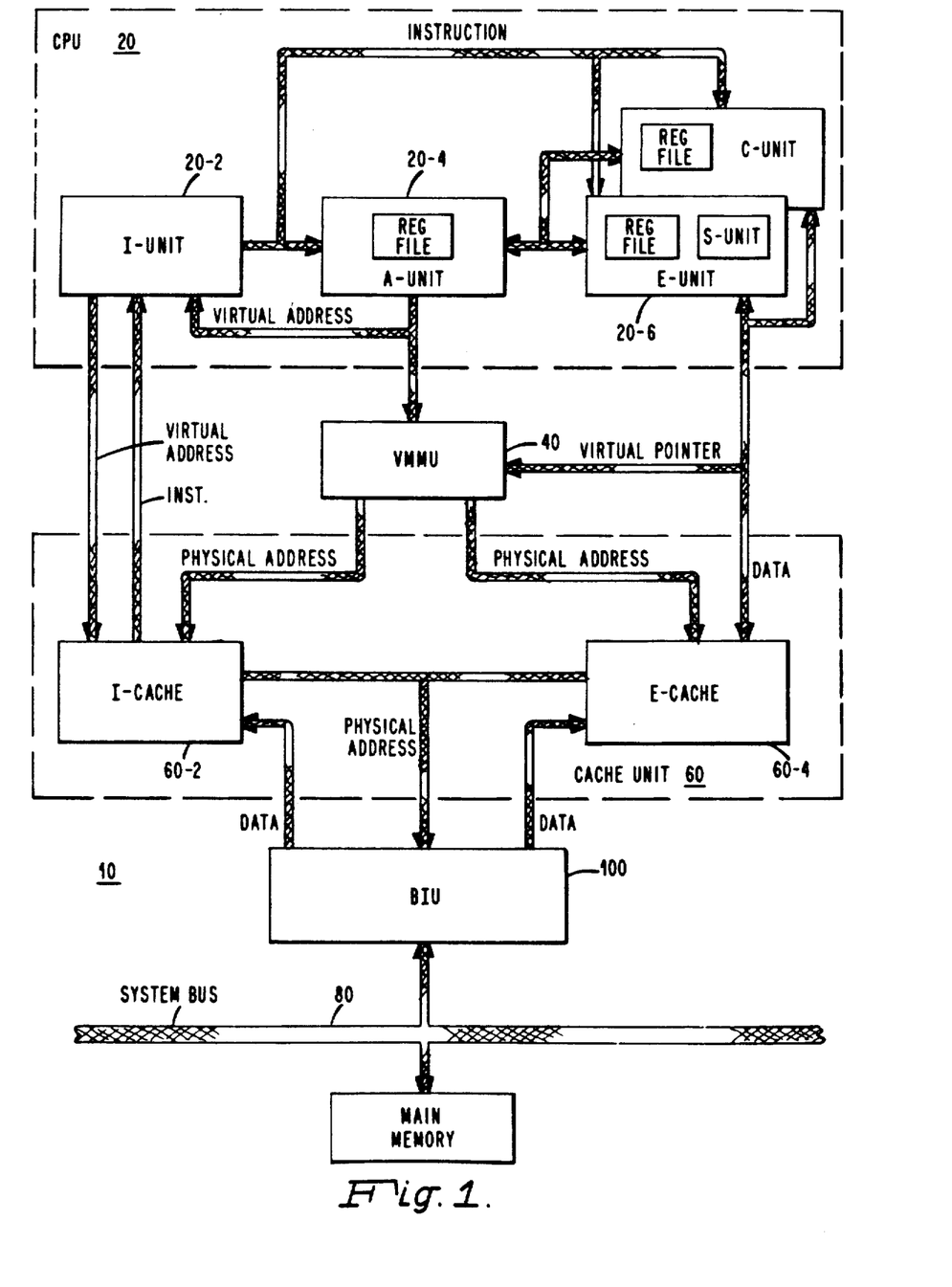
FIG. 1 is a block diagram of the pipelined processing unit which includes the apparatus and method of the present invention.

FIG. 1 shows in block diagram form, a production data processing system 10. As shown, the system includes a central processing unit (CPU) 20, a virtual memory management unit (VMMU) 40 and a cache unit 60. The cache unit 60 couples to a system bus 80 through a bus interface unit (BIU) 100. The processing unit (CPU) is constructed according to the principles of the present invention.

As shown, the main elements of CPU 10 include an instruction unit 20-2, an A-unit 20-4 and a number of execution (E) units 20-6. In the preferred embodiment, the execution units 20-6 include a scientific instruction processing unit (S-Unit) and a commercial instruction processing unit (C-Unit). The cache unit 60 includes an instruction cache (I-cache) 60-2 for storing instructions which are to be executed and an execution cache unit (E-cache) 60-4 for storing operands or data which are to be operated on according to the instructions being executed.

The I-unit 20-2 performs two main functions. It prefetches instructions from I-cache unit 60-2 and cracks or decodes those instructions to determine how the other units, namely the A-unit 20-4 and the E-unit 20-6 will further process those instructions. In addition, the I-unit 20-2 includes branch address generation circuits for executing certain branch instructions which can then be removed from the production line.

The A-unit 20-4 generates addresses from instructions it receives from the I-unit 20-2. Additionally, it has the capability of executing certain types of instructions such as register-to-register type instructions enabling their removal from the production line. When the instruction is a type of instruction which is to be executed by the E-unit 20-6, the A-unit 20-4 sends a virtual address to VMMU 40 which translates it into a physical address for fetching the specified operands from the E-cache unit 60-4. The operands fetched from the E-cache unit 60-4 are then transferred to the E-unit 20-6 for completing the execution of the instruction originally received by the I-unit 20-2 from the I-cache unit 60-2. The A-unit 20-4 includes means for confirming when it has a branch instruction and has sent the branch address back to the I-unit 20-2 which will have already requested the next instruction from I-cache unit 60-2.

Both the A-unit 20-4 and E-unit 20-6 include register files which store the contents of the registers which are programmer accessible, as explained in greater detail herein. Both the I-cache unit 60-2 and E-cache unit 60-4 are updated with instructions and operands fetched from main memory via system bus 100 and BIU 80.

Production Line Mode of Operation

Instructions are executed in a production like fashion by the elements of CPU 20. That is, the I-unit 20-2 receives each instruction from I-cache unit 60-2, cracks it and then sends the instruction to the A-unit 20-4. The A-unit 20-4 either executes the instruction or sends the virtual address to the VMMU 40 for translation in order to fetch the required operands from E-cache unit 60-4 which are in turn sent to E-unit 20-6.

While the A-unit 20-4 is executing its portion of a first instruction received from I-unit 20-2, the I-unit 20-2 is fetching a second instruction and subsequent instructions from I-cache unit 60-2. When the A-unit 20-4 sends the virtual address specified by the first instruction to VMMU 40 and notifies the I-unit 20-2 of that event, the I-unit 20-2 sends the second instruction to A-unit 20-4. The VMMU 40 addresses E-cache unit 60-4 while the A-unit 20-4 is processing the second instruction introduced into the production pipeline. When the E-unit 20-6 is executing the first instruction, VMMU 40 may be fetching operands from the E-cache unit 60-4 specified by the second instruction while the A-unit 20-4 is generating a virtual address for a third instruction. At the same time, the I-unit 20-2 is cracking a fourth instruction and fetching a next instruction. Thus, there could be five instructions progressing down the production line at a given instant of time.

However, since the I-unit 20-2 can execute certain branch instructions and the A-unit 20-4 can execute certain software visible register instructions, these instructions are removed from the production line as soon as the execution of these instructions are completed. Also, when the A-unit 20-4 is processing a branch instruction and the conditions of the branch are met, the A-unit 20-4 immediately confirms the branch address received from the I-unit 20-2 and the branch instruction is removed from the production line.

It is important that the production line operation proceed without interruption. However, there are situations in which there may be conflicts in the resources specified by the instructions being introduced into the production line. The arrangement of the present invention utilizes the fact that certain units of the production line execute a subset of the total number of instructions. Therefore, it takes advantage in terms of performance that only certain registers and indicator resources will ever be in conflict between the A-unit 20-4 and E-unit 20-6.

The reduction in resources is reflected in the resource control word(s) generated by the I-unit 20-2 as a result of cracking each instruction as explained herein. Additionally, complex instructions are specially handled. A complex instruction is an instruction which can have many potential trap conditions which make it very difficult to predict with sufficient certainty, the operating state of the pipeline before the trap took place so that the operation can be restored to that state following the processing of the trap. Such complex instructions are detected by the I-unit and cause it to stop the pipeline. This has the advantage of reducing substantially, chip circuit complexity which is important for the reasons previously mentioned.

Programmer Visible Registers

Figure 2A:
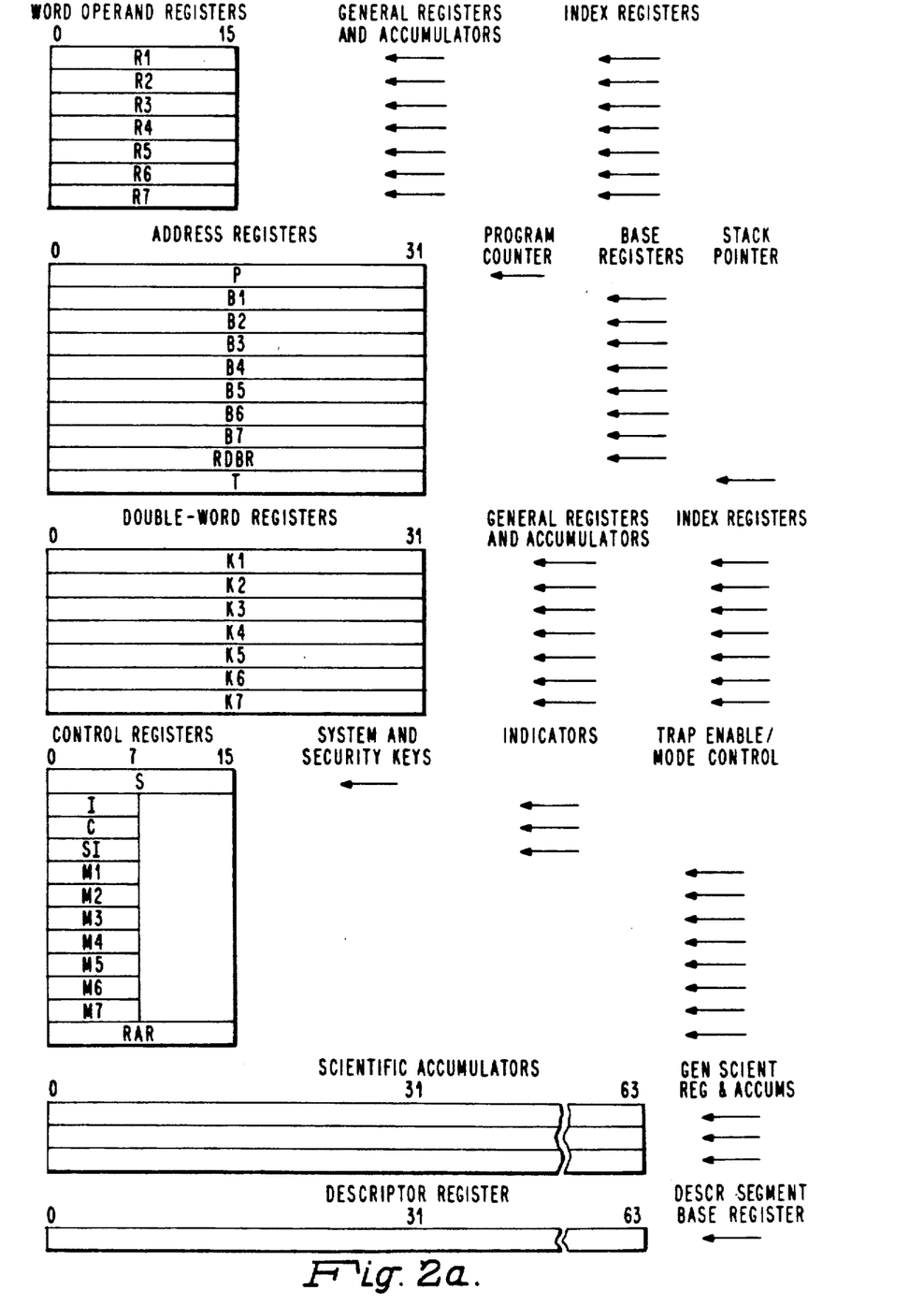

FIG. 2a shows the programmer accessible or visible registers and indicator resources which are shared by the A- and E-units. As shown, there are forty program visible registers which can be loaded and read by various instructions. These include seven general word operand registers, ten address registers, seven general double word operand registers, twelve control registers and three quad word scientific accumulators and one descriptor segment base register. These registers are located in the A-unit 20-4 and E-unit 20-6.

Thirty-two of these registers correspond to locations within register file memories included in the A- and E-units, as indicated in FIG. 1. Whenever, either the A-unit 20-4 or one of the E-units 20-6 writes into a shared register location, the other unit receives a copy of the data written into that location. The reading and writing of the register file memories are controlled by microprogrammed control store units which are located off the A-unit and E-unit chips.

Each of the control store units store sequences of microinstruction words which are read out and loaded into a read data register (RDR) as required for executing instructions received from I-unit 20-2. The A- and E-units each include an arithmetic and logic unit (ALU), in addition to a shifter for performing those operations required for executing the received instructions. The operations and updating of the register file memories within the A- and E-units are described in the previously referenced copending application entitled, "A Mechanism for Automatically Updating Multiple Unit Register File Memories."

The indicator registers I, CI and SI are separate hardware registers located in the A-unit. These registers are updated by both the A- and E-unit circuits. That is, the E-unit 20-6 includes indicator logic circuits which in response to the execution of certain instructions generate signals for updating the indicator registers. The I register contains the program status indicators for general and extended integer instructions. These indicators are assigned to the I register bit positions as follows:

bit0 = overflow indicator OV;
bit1 = reserved for future use
bit2 = a carry indicator C of the latest operation designated to affect this bit;
bit3 = a bit test indicator B representing the status of the last bit tested;
bit4 = an input/output indicator I representing the status of the last peripheral interrogate operation; and
bit5 = a greater than indicator G, bit6 = a less than indicator L and bit7 = an unlike signs indicator U representing the result of the last compare operation.

The CI register which is cleared at initialization time is updated during the execution of commercial instructions. The indicators are assigned to the CI register bit positions are follows:

bit0 = overflow indicator OV;
bit1 = truncation indicator TR which is set during alphanumeric operations;

bit2 = sign fault indicator SF which is set during decimal operations;

bits 3,4 & 7 = reserved for future use;

bit5 = greater than G indicator which is set during the execution of certain decimal and alphanumeric instructions; and bit6 = less than indicator L which is set during the execution of certain decimal and alphanumeric instructions.

The SI register which is cleared at initialization time is updated during the execution of scientific instructions. The indicators are assigned to the SI register bit positions as follows:

bit0 = exponent underflow indicator;

bits 1,4 and 7 = reserved for future use;

bit2 = significance error indicator used during a floating point to integer conversion operation;

bit3 = precision error indicator used during a floating point to integer conversion operation;

bit5 = greater than indicator G; and bit6 = less than indicator L.

According to the teachings of the present invention, only those indicators and registers which can create potential resource conflicts are designated by the resource control words as explained herein. That is, those instructions which can set the I/O indicator, the CI indicators and certain SI indicators also stop pipeline operation and, therefore, have been eliminated. A single bit is used for the group of scientific instructions which do not stop pipeline operation.

I-Unit 20-2

Figure 2B:
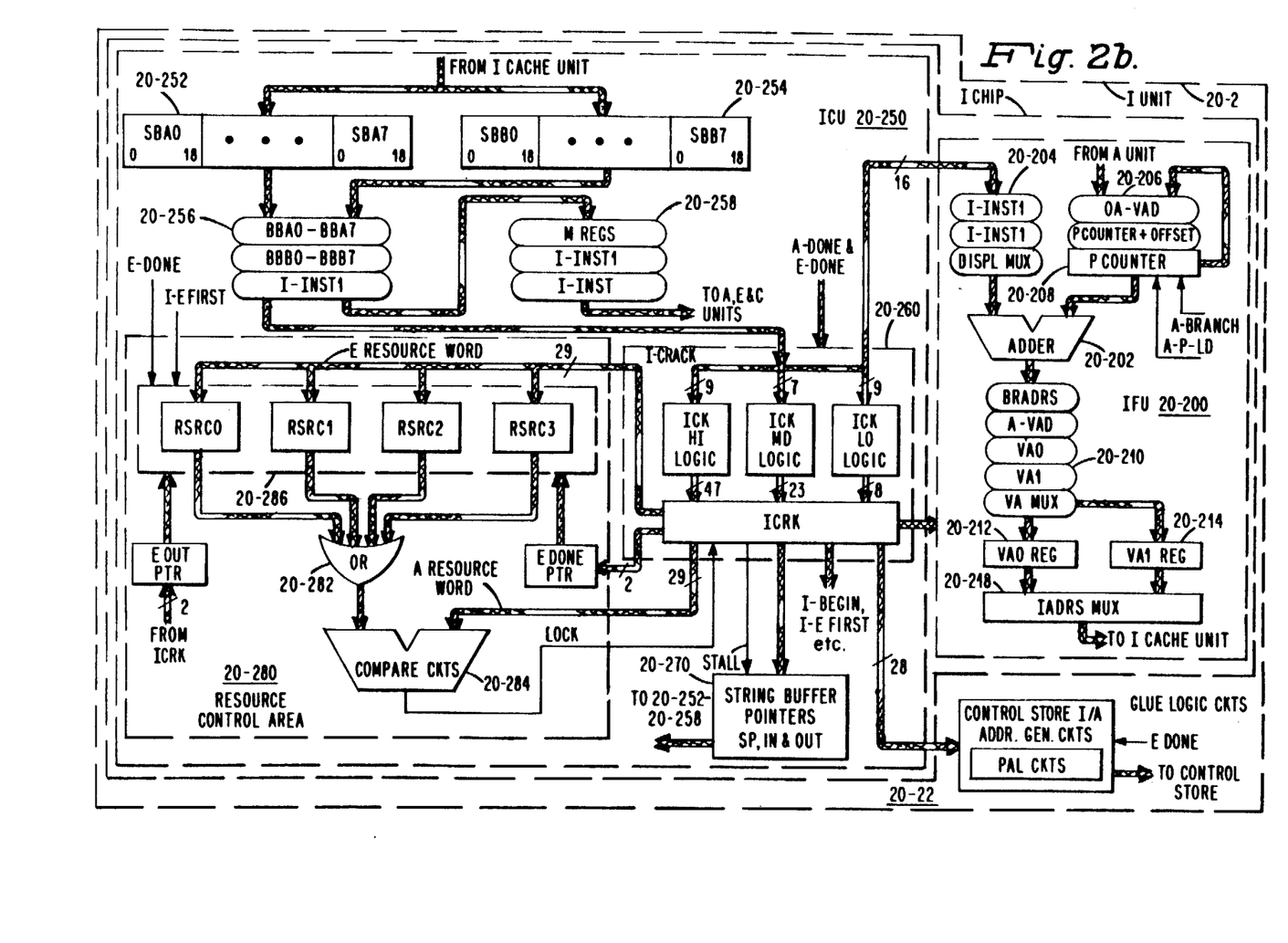

FIG. 2b shows the I-unit 20-2 in greater detail. The I-unit 20-2 includes an I chip 20-20 and glue logic circuits 20-22 which interconnect the I chip to the other chips of the CPU. The I chip 20-20 is logically divided into an I fetch unit (IFU) 20-200 for fetching instructions from the I-cache unit 60-2 and an I crack unit (ICU) 20-250 for "cracking" or decoding the fetched instructions.

The IFU 20-200 includes the adder, multiplexer and register elements 20-202 through 20-218 arranged as shown. The IFU 20-200 uses a local program counter 20-208 to generate branch addresses. Initially, the P counter 20-208 and one of the virtual address registers (20-212 or 20-214) are loaded with a virtual address received from A-unit 20-4 via multiplexer circuit 20-206 or 20-210, respectively, in response to a load signal A-P-LD also received from the A-unit 20-4. The virtual address points to the location in I-cache unit 60-2 which stores the next instruction that is to enter the pipeline. During an I fetch cycle, the virtual address is transferred to I-cache unit 60-2 from either VA0 register 20-212 or VA1 register 20-214 through multiplexer circuit 20-218.

Either VA0 register 20-212 or VA1 register 20-214 is used to furnish the virtual address until a branch instruction is decoded by the I-unit 20-2. At that time, the I-unit 20-2 will switch the VA register such that if VA0 register is active, then the address called for by the branch instruction is stored in VA1 register 2-214. If the ICU 20-250 detects a small (seven or sixteen bit) displacement branch instruction, then the I-unit will generate the branch address by sending a sixteen bit displacement value to IFU 20-200 via multiplexer circuit 20-204. This value is added via adder 20-202 to the contents of the P counter 20-208 to create the branch address. It is then loaded into the VA register selected by the VA pointer.

The ICU 20-205 includes two sets of string buffers (SBA and SBB) which correspond to blocks 20-252 and 20-254. Each buffer includes eight sixteen bit registers and receives data from the I-cache unit, two words or thirty-two bits at a time. As shown, each instruction read out of I-cache unit 60-2 is loaded into either buffer 20-252 or 20-254. The ICU 20-250 maintains a current string pointer denoting which of the two string buffers is in use, in addition to input and output and count pointers for each set of buffers.

One of the string buffers receives a stream of successive instructions from I-cache unit 60-2. If there is a branch instruction, the instructions of the new stream following the branch are stored in the other string buffer. As shown, each instruction of the instruction stream being processed is transferred via multiplexer 20-256 to the I crack logic circuits of block 20-260 and to the A- and E-units via multiplexer 20-258. The I crack logic circuits of block 20-260 include three cracking or decoding circuit areas ICKHI, ICKMD and ICKLO. Each of the crack areas decode or crack in parallel, a different group of bits of each instruction.

The results of the first stage are applied to a second stage of cracking or decoding which corresponds to the block labeled ICRK. The ICRK stage determines exactly what instruction is being processed with which address syllable etc. That is, it determines the specific kind of instruction which is to be executed. If it is a software visible register to register instruction, it will be executed by the A-unit 20-2, and if it is a memory instruction, it will be executed by the E-unit 20-6. The ICRK stage provides signals to update the string buffer counters 20-270 and the resource control pointer circuits of the resource control area block 20-280. The I crack circuits 20-260 also apply the instruction word signals to the control store I/A address generation circuits 20-220 of the glue logic circuits 20-22. The generation circuits 20-220 address the A-unit control store which reads out a microinstruction word into the A-unit RDR register for executing the instruction.

The last part of the ICU 20-250 is the resource control area 20-280 which is constructed according to the teachings of the present invention. The block 20-280 operates in preventing instructions which can produce resource conflicts from entering the pipeline. As shown, block 20-280 includes a number of resource control registers RSRC0-RSRC3 corresponding in number to the number of stages in the pipeline which can be processing instructions. Block 20-280 also includes a set of OR circuits 20-282 for logically ORing signals from corresponding bit positions of each of the resource control registers which are applied to a first set of inputs of the compare logic circuits of block 20-284. The compare logic circuits 20-280 receive at a second set of input signals from the ICRK stage which are generated as part of an A resource control word as the result of cracking or decoding the next instruction as described herein.

Additionally, the resource area 20-280 includes a two-bit pointer EOUTPTR which selects which one of the four resource registers will be used to store the resource word for the next instruction to be executed by the E-unit 20-6. Each time a word is stored, the EOUTPTR pointer is incremented by one. As the instructions are completed by the E-unit 20-6 and removed from the pipeline, the E resource registers are cleared in sequence. Another two bit pointer EDONEPTR is used to select the register to be cleared. The EDONEPTR pointer is incremented by one, each time an E-unit instruction is completed.

Resource Control Words

Figure 3:
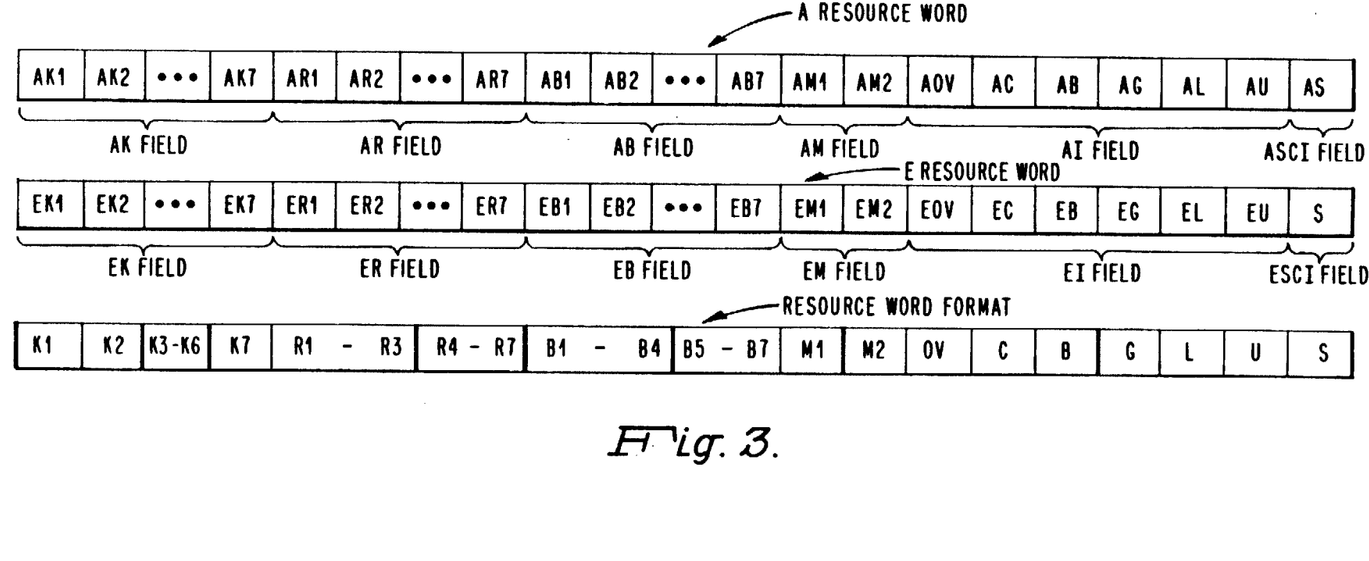
FIGS. 3a and 3b are diagrams used to explain the operation of the preferred embodiment of the present invention.

When an instruction is cracked, the circuits 20-260 determine which of the resources that could be potentially needed by the A- and E-units will be used in the A-unit for executing the instruction. FIG. 3 shows the format of the A and E resource control words used to represent all of the register and indicator resources shared between the A- and E-units. As seen from the Figure, the resources selected from the complement of visible and indicator registers of FIG. 2a that could be potentially needed by both the A- and E-units simultaneously are: the seven K registers, the seven R registers, the M1 and M2 registers and the OV, C, B, G, L, U, and S indicators.

Each of these resources is represented by a different bit in the A resource control word (ARSRC) and a corresponding bit in the E resource control word (ERSRC) as shown in FIG. 3. Since up to four E-unit instructions can be in various stages of processing in the pipeline at one time, there can be up to four ERSRC words which can be stored within resource control area 20-280. The pertinent signals for generating the resource control words are included in an appendix.

Description of Operation

With reference to FIGS. 1 through 3, the operation of the present invention will now be described relative to processing the sequences of instructions of FIGS. 4a through 4g. As previously discussed, in the production line mode of operation, the A-unit 20-4 can potentially use resources for each instruction received by the I-unit 20-2. Also, these same resources in the case of certain instructions can be used by one of the E-units 20-6 (e.g., E, CIP or SIP).

Accordingly, in response to each instruction received, the I-unit crack logic circuits determines which unit will execute the instruction and the corresponding resource control word. That is, the I crack logic circuits from the combination of instruction bits, generate an E-unit instruction signal EINSTR when the instruction is to be executed by one of the E-units 20-6. This signal is used to transfer the instruction to the E-unit instruction FIFO buffer under the control of I instruction signals I-EFIRST and I-ELAST. That is, signal I-EFIRST enables the E-IFIFO buffer to be loaded with the first double word of the instruction while signal I-ELAST enables the loading of a last instruction double word into the E-IFIFO buffer.

When the I-unit is ready to crack the instruction, it generates a CRACK signal indicating that it is ready to decode the next instruction, that one of the string buffers contains at least one instruction double word or a single word instruction and that the A-unit has generated an A-DONE signal indicating that it has completed the execution of the previous instruction. The CRACK signal causes the generation of an I-BEGIN signal which is sent to the A-unit during the cycle that the I-unit sends the first instruction double word of a valid instruction to the A-unit.

Figure 4A:
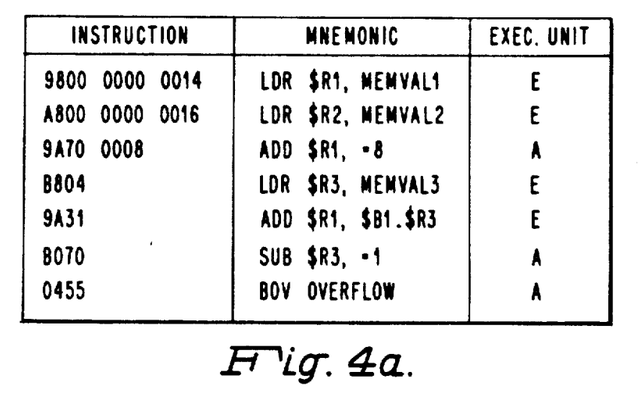
FIGS. 4A-4E are diagrams showing the processing of a sequence of instructions according to the present invention.

Considering the operation in greater detail, FIG. 4a depicts a first sequence of instructions which produces several different types of resource conflicts. The first conflict occurs between an E-unit load register (LDR) instruction specifying the use of programmer visible register R1 and the later occurring A-unit add instruction specifying the use of the same R1 register. The second conflict occurs between an E-unit load register (LDR) instruction specifying register R3 and another E-unit add instruction that specifies the use of register R3 for address generation taking place in the A-unit. The final conflict occurs between this E-unit add instruction and the branch on overflow instruction occurring during instruction execution.

FIGS. 4b through 4f depict the states of the E resource registers RSRC0 through RSRC3 and EDONE and EOUT pointers during successive I cycles of operation required for processing the sequence of instructions. The instruction sequence is stored in 1 cache unit 60-2. The instructions having the indicated mnemonics are shown in hexadecimal form. For example, the first instruction is coded as 9800 0000 0014 and is a three word load R1 register instruction using an immediate memory address of hexadecimal 14. The VMMU 40 converts this virtual address into a physical address which is applied to E cache unit 60-4 to fetch the memory operand value (labeled MEMVAL1). This value is to be loaded into register R1 located in the register file of the E-unit 20-6 upon execution of the LDR instruction.

It is assumed that the resource registers are empty and the EOUT and EDONE pointers are both pointing to E resource register RSRC0 prior to the start of the instruction sequence. The I-unit 20-2, during the first cycle of FIG. 4b, fetches the LDR instruction from the I cache unit 60-2 using the address specified by the VA0 register 20-212 of FIG. 2b and stores it in SBA string buffer 20-252. That is, IFU 20-200 is initialized by A-unit 20-4 which transfers an address to VA0 register 20-212 via multiplexer 20-210 (i.e., position A-VAD). The I cache unit 60-2 reads out the first two words of the three word LDR instruction into the SBA buffer 20-252. The IFU 20-200 continues to fetch instructions until the instruction buffer is full.

Figure 4B:
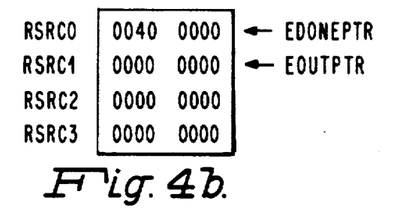

During the second cycle, the LDR instruction is applied via multiplexer 20-256 to the I crack logic circuits. These circuits crack the instruction's op-code which result in the ICRK stage generating an E resource word ERSRC = 00400000 and an all ZERO A resource word ARSRC. The coding of the resource bits indicate that the E-unit 20-6 requires the use of general register R1 in executing the LDR instruction and that the A-unit 20-4 does not require any of the resources it shares with the E-unit. The bit ER1 is set to a binary ONE state as a result of decoding the instruction. The equation for ER1 is included in the appendix. Next, the I-unit 20-2 applies signal I-BEGIN to enable the A-unit op-code register to be loaded with the first word of the LDR instruction for continued processing.

During the next clock cycle, the E resource word ERSRC value is loaded into E resource register RSRC0. Also, the EOUT pointer is incremented by one to point to the next resource register RSRC1. The results are as shown in FIG. 4b. The immediate memory address (the second and third words of the instruction) is also forwarded to A-unit 20-4.

During a fourth clock cycle, the second LDR instruction fetched by IFU 20-200 from the I cache unit 60-2 is cracked by the I-unit 20-2. This results in the generation of an E resource word ERSRC = 00200000 and an A resource word ARSRC having all zeros. The coding of the E resource bits indicate that the E-unit 20-6 requires the use of general register R2 in executing the LDR instruction. That is, bit ER2 is set to a binary ONE state as a result of cracking the instruction's op-code. Again, the A-unit does not require any resources. The OR circuits 20-282 logically combine the stored groups of E resource word bit positions which are, in turn, compared with the A resource word. Since there is no match (i.e., the LOCK signal is a binary ZERO), the ICRK stage generates signal I-BEGIN. This again enables the instruction word op-code to be transferred to the A-unit 20-4.

Figure 4C:
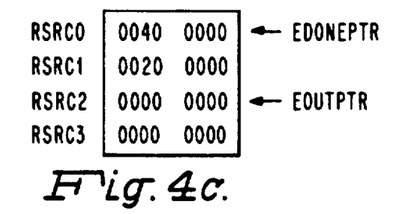

During a fifth clock cycle, the E resource word ERSRC is loaded into E resource register RSRC1. Again, the EOUT pointer is incremented by one to point to E resource register RSRC1. The results are as shown in FIG. 4c. Also, the IMA for the LDR instruction is sent to A-unit 20-4.

During a sixth clock cycle, the first ADD instruction fetched by IFU 20-200 from I cache unit 60-2 is cracked by the I crack logic circuits 2-260. This results in the generation of an E resource word ERSRC=0000 0000 and an A resource word ARSRC=0040 0060. The coding of the E resource word bits indicates that the E-unit does not require any resources in executing the ADD instruction and that the A-unit 20-4 requires the use of the general register R1 and the overflow (OV) and carry (C) indicators. The bit AR1 is set to a binary ONE state as a result of decoding the instruction's op-code. The OV and C indicator bits are also set based on such decoding.

The OR circuits 20-282 logically combine the stored groups of E resource word bit positions which are compared with the A resource word. In this case, the R1 bits in the A resource word ARSRC and E resource word stored in register RSRC0 match. This causes compare circuits 20-284 to force the LOCK signal to a binary ONE. Signal LOCK, in turn, causes the ICRK stage to force the STALL signal to a binary ONE preventing the ADD instruction from entering the pipeline.

In greater detail, the STALL signal prevents instructions from entering the pipeline by inhibiting signal I-BEGIN and I-EFIRST from switching to binary ONES. The STALL signal is applied to the string buffer pointers and prevents the string buffer OUT pointer from changing state. Thus, the OUT pointer remains pointing to the instruction which produced the conflict until the conflict is removed.

It will be noted that since the ADD instruction is being executed by the A-unit 20-4, the all ZEROS E resource word is not stored in register RSRC2. However, if the instruction were to be executed by the E-unit 20-6, the all ZEROS resource word would be stored in register RSRC2 for design simplicity.

Figure 4D:
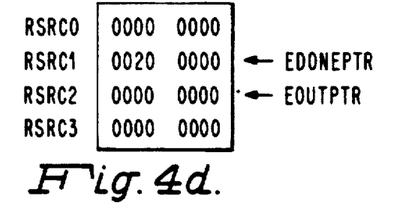

During a next clock cycle that the E-unit 20-6 completes the execution of the first LDR instruction, it signals this fact by sending signal E-DONE to the I-unit 20-2. This causes the ICRK stage to clear E resource register RSRC0 to ZEROS resulting in signals LOCK and STALL being forced to ZEROS. At that time, the EDONE pointer is incremented by one so that it points to E resource register RSRC1. The results are as shown in FIG. 4d. The ADD instruction is now allowed to enter the pipeline and is sent to A-unit 20-4 for execution.

During the next clock cycle, when the third LDR instruction is cracked by the I crack logic circuits 2-260, this results in the generation of an E resource word ERSRC=0010 0000 and an A resource word ARSRC=0000 0000. The coding of the E resource word bits indicates that the E-unit 20-6 requires the use of general register R3, while the A resource word bits indicate that the A-unit does not require any resources it shares. The bit ER3 is set to a binary ONE state as a result of decoding the instruction's op-code. Since there is no conflict, the LOCK signal remains a binary ZERO which enables the LDR instruction to enter the pipeline (i.e., it is loaded into the A-unit op-code register). When the E-unit 20-6 completes its execution of the second LDR instruction, it generates signal E-DONE which results in clearing E resource register RSRC1 to ZEROS and incrementing EDONE pointer by one so that it now points to E resource register RSRC2.

Figure 4E:
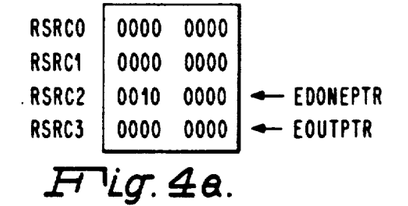

During the next clock cycle, the E resource word ERSRC is loaded ito E resource register RSRC2. Also, the EOUT pointer is incremented by one so that it now points to E resource register RSRC3. The results are as shown in FIG. 4e. The IMA for the LDR instruction is also sent to A-unit 20-4.

During the next clock cycle, the second ADD instruction fetched from hexadecimal location 9A31 is cracked by the I crack logic circuits 2-260. This results in the generation of an E resource word ERSRC=0040 0060 and an A resource word ARSRC=0010 8000. The coding of the resource word bits indicates that the E-unit 20-6 requires the use of general register R3 and indicators OV and C and that the A-unit 20-4 requires the use of general register R1 and address register B1. The bits ER3, OV, and C are set to binary ONES as a result of decoding the instruction op-code. The bits AR1 and AB1 are set to binary ONES based on similar decoding.

The compare circuits 20-284 compare the corresponding bit positions in the A resource word ARSRC to the E resource word contents of the RSRC registers and detect a match between the R3 bits in the ARSRC word and the E resource word stored in register RSRC2. This forces signals LOCK and STALL to binary ONES preventing the second ADD instruction from entering the pipeline.

In the above situation, the conflict results from two E-unit instructions. That is, the conflict occurs only because A-unit 20-4 requires the use of a shared resource to generate an operand address, and that resource has already been tagged for use by a preceding E-unit instruction.

Figure 4F:
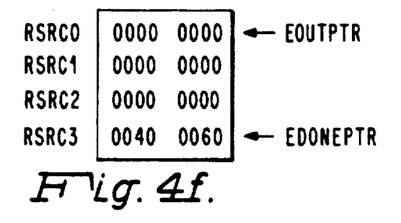

In a subsequent clock cycle, when the E-unit 20-6 completes the execution of the third LDR instruction, it signals this by again generating signal E-DONE. This causes E resource register RSRC2 to be cleared, forcing signals LOCK and STALL to binary ZEROS. At the same time, EDONE pointer is incremented by one so that it points to register RSRC3. This enables the ADD instruction to enter the pipeline. Also, the E resource word is loaded into register RSRC3 and the EOUT pointer is incremented by one to point to register RSRC0. The results are as shown in FIG. 4f.

During the next clock cycle, the SUB instruction is cracked by the I crack logic circuits 20-260. This results in the generation of an E resource word ERSRC=000 0000 and an A resource word ARSRC=0010 0000. The coding of the resource bits indicates that the E-unit 20-6 requires no resources in executing this instruction while the A-unit 20-4 requires the use of general register R3. That is, bit AR3 is set to a binary ONE state by decoding the instruction's op-code.

The compare circuits 20-284 compare the corresponding bit positions in the A resource word ARSRC to the E resource word contents of the RSRC registers and find no match. This enables the SUB instruction to be transferred to A-unit 20-4.

During the next clock cycle, the I crack logic circuits 20-260 crack the branch on overflow instruction. As a result, this generates an E resource word ERSRC=0000 0000 and an A resource word ARSRC=0000 0040. The coding of the resource bits indicates that the E unit 20-6 requires no resources in executing this instruction, while the A-unit 20-4 requires the use of the overflow indicator. That is, bit AOV is set to a binary ONE state by decoding the instruction's op-code.

The compare circuits 20-284 compare the corresponding bit positions in the A resource word ARSRC to the E resource word contents of the RSRC registers and find a match between the OV bits in the ARSRC word and E resource contents of register RSRC3. This forces signals LOCK and STALL to binary ONES, preventing the branch instruction from entering the pipeline. As soon as E-unit 20-6 completes the execution of the second ADD instruction, it sends signal E-DONE which clears E resource register RSRC3 forcing signals LOCK and STALL to binary ZEROS. At that time, EDONE pointer is incremented by one to point to register RSRC0. The BOV instruction is transferred to the A-unit 20-4 for execution.

From the above, it is seen how the present invention enables the identification of those instructions which can be processed by different stages of the pipeline without any conflict in resources, thereby speeding up performance. The resource conflict circuits are designed to enable instructions of the different execution units to enter the pipeline if such instructions can be processed without having to stop the pipeline.

For example, there is a certain type of scientific instruction set (IEEE standard), most of which can be processed without having to stop the pipeline as contrasted with native mode scientific instructions which have been categorized as complex instructions. The following is a sequence of these instructions.

| Instruction | Description | Exec Unit |
|---|---|---|
| ISML | IEEE sci. multiply | E |
| ISCR | IEEE sci. compare/reg. | E |
| . | . | . |
| . | . | . |
| . | . | . |
| SBL | Sci. branch on less than | A |

As mentioned, the scientific instruction sets use a separate set of resources (accumulators and indicators) from those used by non-scientific instructions. Therefore, the only potential conflict involving such instructions could occur between a scientific instruction being executed in E-unit 20-6 and a subsequent scientific branch instruction executed in A-unit 20-4.

The ISML instruction of the above sequence is the first instruction cracked by the ICRK circuits 20-260. Since it does not affect any indicators, it does not set the S bit in the E resource word ERSRC. The cracking of the next instruction ISCR establishes that this instruction affects the scientific G, L, and U indicators. Therefore, it sets the S bit in the E resource word ERSRC. Accordingly, when the ICRK circuits 20-260 crack the SBL instruction, the S bit is set in the A resource word ARSRC, since the instruction affects the less than (L) indicator. Therefore, compare circuits 20-284 detect a conflict between the S bits in the A and E resource words. As a result, the SBL instruction is not permitted to enter the pipeline until the E-unit 20-6 completes the execution of the ISCR instruction. If there were not a compare instruction included in the sequence, the branch instruction could immediately enter the pipeline and be processed. When several instructions are included between the compare and branch instructions, the compare instruction would be completed before the branch instruction is cracked. The invention eliminates delays by only stopping pipeline operation when there is an actual resource conflict, otherwise instructions are allowed to enter the pipeline.

APPENDIX

The mnemonics of the instructions are given in the publication entitled, "Hardware Version of DPS6 Programmers Pocket Guide," Order No. CU75-02 (August 1984) and subsequent updates. The notations in the Boolean equations are as follows:

EQ 0100 EQUAL TO HEXADECIMAL 0100
GT 3 GREATER THAN HEXADECIMAL 3
EQ 2 NOT EQUAL TO HEXADECIMAL 2
NLT 018 NOT LESS THAN HEXADECIMAL 018
NGT 01E NOT GREATER THAN HEXADECIMAL 01E
LT 3 LESS THAN HEXADECIMAL 3.

The I-BEGIN signal is generated by the Boolean equation:

I-BEGIN=CRACK & $\wedge$STALL & $\wedge$HOLD
wherein CRACK=READY & $\wedge$NONELEFT & ADONE.

The $\wedge$ signifies a negated signal, i.e., $\wedge$HOLD should be read as the "NOT HOLD" signal.

The Boolean equation for the I-EFIRST signal is:
I-EFIRST=CRACK & $\wedge$STALL & EINSTR.

The Boolean equation for signal EINSTR is generated as a function of combinations of bits of the different types of instructions that require execution by the E-unit 20-6. The Boolean equation is:

EINSTR=GCS+(IO+IOLD+SC+MASK-+BIT4+LB+LEV+INCDEC & $\wedge$RAS+MTM+MUL+DIV+STM+SSBP) & EII+(BSTORE+EBIM0) & IMO+EMSK & $\wedge$EII+MLV & (SI+ESI & EII1)+(ESO+EDO) & ($\wedge$ERAS & (EII1+EII23)+AS3EII45)+EEII & (EII1+EII23)+(SDO+SO) & $\wedge$RAS & $\wedge$IMO & $\wedge$EII.

DESCRIPTION OF EQUATION TERMS

GENERIC, COMMERCIAL, OR SCIENTIFIC INSTRUCTIONS
GCS=I-INST (0-8).EQ.0;
IO INSTRUCTION
IO=(I-INST (0-8).EQ.0100)
IOLD INSTRUCTION
IOLD=I-INST (0-8).EQ.0103
SINGLE OPERAND INSTRUCTIONS
SO=(I-INST) (0-3).EQ.8 & ((I-INST (4-8).EQ.1)-+(I-INST (4-8).GT.3))
SINGLE OPERAND INSTRUCTION THAT USES B REGISTERS IN THE E-UNIT 2-6
SSBP=I-INST (0-8).EQ.0106

SINGLE OPERAND INSTRUCTIONS THAT USE OVERFLOW, (NEG, CAD, AID, SID, INC., DEC. INSTRUCTIONS)
SOV=SO & ((I-INST (4-8).EQ.4)+(I-INST (4-8).EQ.01D)+(I-INST (4-7).EQ.4)+INCDEC
LB INSTRUCTION
LB=SO & (I-INST (4-8).EQ.05)
BIT INSTRUCTIONS (LBF, LBT, LBC, LBS)
BIT4=(I-INST (0-5).EQ.022) & (I-INST (8).EQ.0)
BASIC DOUBLE OPERAND OR SCIENTIFIC INSTRUCTIONS
SDO=(I-INST (0-3).GT.8) & (I-INST (4-8).NEQ.2)
BASIC INSTRUCTIONS WITH IN-LINE MASK WORD: (SRM, NSAVE, NRSTR, SAVE, RSTR)
MASK=(I-INST 0).EQ.1) & (RLBP.NEQ) & I-INST (4-8). EQ.015)+(I-INST (0-7).EQ.085)+(I-INST (0-7).EQ.08F)
SCIENTIFIC SINGLE AND DOUBLE OPERAND INSTRUCTIONS
SC=((I-INST (0-3).GT.8) & ((I-INST (4-8).EQ.011)-+(I-INST (4-8).EQ.013)+(I-INST (4-8).EQ.018)-+(I-INST (4-8).EQ.01A))) & $\wedge$EII1 & $\wedge$EII23 & $\wedge$AS3EII45
DOUBLE OPERAND INSTRUCTION THAT USES M REG AND DOES NOT STOP PIPELINE
STM=(I-INST (O).EQ.1) & (RLBP.NEQ.0) & (I-INST (4-8) .EQ OE)
WHERE RLBP =I-INST (1-3)
MULTIPLY INSTRUCTION
MUL=(I-INST (0).EQ.1) & (RLBP.NEQ.0) & (I-INST (4-8) .EQ 016)
DIVIDE INSTRUCTION
DIV=(I-INST (0).EQ.1) & (RLBP.NEQ.0) & (I-INST1 (4-8) .EQ 06)
MODIFY OR TEST M REGISTER INSTRUCTION
MTM=(I-INST (0-3).GT.8) & (I-INST (4-8).EQ.0)
SO, DO STORE INSTRUCTIONS NEG, SSBP, CPL, CALL, CL, CLH, LBF, DEC, LBT, LBS, INC, LBC, STS,SDI, CAD (ALSO LEN) STM, STH, SRM, SWR, SWB, STR, STB
BSTORE=SO & ((I-INST(4-8).EQ.4)+(I-INST(4-8).EQ.6)+(I-INST(4-6).EQ.3)+(I-INST(4-7).EQ.0A)+(I-INST(4-7).EQ.8)+(I-INST(4-8).EQ.018)+(I-INST(4-8).EQ.01A)+(I-INST(4-7).EQ.0E))+BIT4 +SDO & ((I-INST(5-7).EQ.7)+(I-INST(4-8).EQ.015)+(I-INST(4-6).EQ.7))
SHORT VALUE IMMEDIATE INSTRUCTIONS
SI=(I-INST(0).EQ.0) & (RLBP.NEQ.0) & (I-INST(4-7).GT.OB)
IMO INSTRUCTIONS THAT USE B REG IN E-UNIT 2-6 (LDB, LAB, STB, SWB)
EBIMO=(I-INST(0-3).GT.8) & ((I-INST(4-8).EQ.019)+(I-INST(4-8).EQ.017)+(I-INST(4-8).EQ.01D)+(I-INST(4-8).EQ.01F))
LEV INSTRUCTION
LEV=SO & (I-INST(4-8).EQ.01C)
INC AND DEC INSTRUCTIONS
INCDEC=SO & ((I-INST(4-8).EQ.011)+(I-INST (4-8) .EQ 015))
MLV OR MLVK INSTRUCTION
MLV=I-INST(6-7).EQ.3
EXTENDED INTEGER SINGLE OPERAND INSTRUCTIONS
ESO=(I-INST(0-3).EQ.8) & (I-INST(4-8).NLT.018) & (I-INST(4-8).NEQ.01B) & (I-INST(4-8).NGT.01E)
EII SO THAT USE OVERFLOW & DOES NOT STOP PIPELINE: KINC, KDEC, KNEG, KNEGB INSTRUCTIONS
ESOV=ESO & (I-INST(6-7).LT.3) & (I-INST(6-8).NEQ.1)
EII SHORT VALUE IMMEDIATE INSTRUCTIONS
ESI=EBK & (I-INST(8).EQ.1)
EXTENDED INTEGER DOUBLE OPERAND INSTRUCTIONS
EDO=(I-INST(0-3).GT.8) & (I-INST(4-7).NLT.4)
EXTENDED INTEGER INSTRUCTION (EII) INSTR WITH IN-LINE MASK DOUBLEWORD
EMSK=(I-INST(0).EQ.1) & (RLBP.NEQ.0) & (I-INST(4-8) .EQ.OF)
WHERE RLBP=I-INST (1-3)
EII INSTRUCTIONS EXECUTED IN E-UNIT 2-6 THE INSTRUCTION INCLUDES A REGISTER ADDRESS SYLLABLE (RAS) OR AN (IMO) (KDIV, KMUL, KMULP, KDIVP INSTRUCTIONS)
EEII=KDIV+KMUL+KDIVP+KMULP
KDIV=(I-INST(0).EQ.1) & (RLBP.NEQ.0& (I-INST(4-8) .EQ.017)
KMUL=(I-INST(0).EQ.1) & (RLBP.NEQ.0) & (I-INST(4-8) .EQ.01F)
KDIVP=(I-INST(0) & (RLBP.NEQ.0) & (I-INST(4-8) .EQ.01C)
KMULP=(I-INST(0).EQ.1) & (RLBP.NEQ.0) & (I-INST(4-8) .EQ.01E)
EII1=I-INST(9-15).EQ.06C
EII23=I-INST(9-15).EQ.07C
AS3EII45=I-INST(9-15).EQ.058
RAS=(I-INST(9-11).EQ.5) & (I-INST(12).EQ.0) & (I-INST(13-15)NEQ.0)
IMO=I-INST(9-15).EQ.070
KAS=(I-INST(23-28).EQ.01A) & NC
ERAS=(I-INST(24-28).EQ.01A) & NC
NC=I-INST (29-31).NEQ.0
EII=EII1+EII23+AS3EII45

The A resource bits are generated according to the following Boolean equations:

```
AB1 =  (RLB.EQ.1) & (SDO & BRG & RAS + IMO & I-INST(0) & (I-INST
       (4-8).EQ.01B) + EDO & EB & ERAS &
       (EII1 + EII23)) +
       (REGN.EQ.1) & ((CMN + SDO & BRG) & RAS + (SO + SDO) &
       ((RM.NEQ.5) + (I-INST(12).EQ.1))) +
       (REGN.EQ.5) & (SO + SDO) & (RM.GT.4) & (I-INST(12).
       EQ.1) +
       (REN.EQ.1) & (ESO + EDO) & (EII1 & (ERAS & (I-INST
       (20-23).EQ.0E) + ((REM.NEQ.5) +
       (I-INST(28).EQ.1)) & (EMAP.EQ.1)) +
       EII23 & ((EMAP.EQ.0) + (REM.GT.0) &
       ((I-INST(28).EQ.1)
```

```
(REM.EQ.7) + (REM.NGT.3))) +
AS3EII45 & (EMAP.EQ.0) &
(REM.GT.0) & ((I-INST(28).EQ.1) +
(REM.GT.3)) +
(EMAP.EQ.1) & ((I-INST(28).EQ.0) +
(REM.GT.0)))) +
(REN.EQ.1) & ((SO + SDO) & ASN + GCS & ISM) & ((MAP.EQ.
0) + (MAP.EQ.1) & (REM.GT.0) &
((I-INST(28).EQ.1) + (REM.LT.4) +
(REM.EQ.7)) + (MAP.EQ.2) & (REM.GT.0) &
((I-INST(28).EQ.1) + (REM.GT.3)) +
(MAP.EQ.3) & ((I-INST(28).EQ.0) +
(REM.GT.0))) +
(REN.EQ.5) & (ESO + EDO) & EII1 & (EMAP.EQ.1) &
(REM.GT.4) & (I-INST(28).EQ.1).
```

AOV=GOV+SHOV&(SSH)+O-SHOV&(LSH)+(SOV+ADDSUB)& RAS+-(AIDSID+ADDSUB)&IMO+OSHOV & ESHI+NSHOV & ESHO & NSH+(ESOV-+EDOV) & ERAS & (EII1+EII23)+ESI & ADV & EII1.

AC=(SOV+ADDSUB) & RAS+(AIDSID-+ADDSUB) & IMO+(ESOV+EDC) & ERAS & (EII1+EII23)+ESI & ADV & EII1+GC+SHC & SSH)+(OSHC & LSH)+OSHC & ESH1+NSHC & ESHO & NSH

AR1=(LSH+ESHO+ESH1) & LSO+SSH & SSORDD+(RLB.EQ.1) & (SI & ∧MLV+BR+SSH+LSH+RAS & ERIMO+SDO & ∧SC & ∧BRG & ∧MUL & ∧DIV & ∧STM & ∧MTM & ∧ERIMO & (RAS+IMO))+(REGN.EQ.1) & RAS & (SO & SSBP & ∧CMN & ∧LB & ∧BIT4 & ∧LEV+SDO & ∧SC & ∧BRG & ∧MUL & ∧DIV ∧STM & ∧MTM)+(REN.EQ.1) & ∧(ESO & ∧KAVM+EDO & ∧EEII & ∧EMSK)&EII1 & ERAS & (I-INST(20-21).LT.3)+(RM.EQ.1) & (SO+SDO)+(RM.EQ.5) & (SO+SDO) & (NBITS.GT.8) & (NBITS.NEQ.OC)+(REM.EQ.1) & (((SO+SDO) & ASN+GCS & ISM) & (MAP.EQ.0) & ENBITS.GT.0)+(ESO+EDO) & (EII1 & (EMAP.EQ.1)+EII23 & (EMAP.EQ.0) & (ENBITS.GT.0)+AS3EII45 & (EMAP.EQ.0) & (ENBITS.EQ.0)))+(REM.EQ.5) & (ESO+EDO) & EII1 & (EMAP.EQ.1) & (ENBITS.GT.8) & (ENBITS.NEQ.OC).

AR3=(RLB.EQ.3) & (SI & ∧MLV+BR+SSH+LSH+RAS & ERIMO+SDO & ∧SC & ∧BRG & ∧MUL & ∧DIV & ∧STM & ∧MTM & ∧ERIMO & (RAS+IMO))+(REGN.EQ.3) & RAS & (SO & ∧SSBP & ∧CMN & ∧LB & ∧BIT4 & ∧LEV+SDO & ∧SC & ∧BRG & ∧MUL & ∧DIV & ∧STM & ∧MTM)+(REN.EQ.3) & (ESO & ∧KAVM+EDO & ∧EEII & ∧EMSK) & EII1 & ERAS & (I-INST(20-21).LT.3)+(RM.EQ.3) & (SO+SDO)+(RM.EQ.7) & (SO+SDO) & (NBITS.GT.8) & (NBITS.NEQ.OC)+REM.EQ.3) & (((SO+SDO) & ASN+GCS & ISM) & (MAP.EQ.0) & (EN-BITS.GT.0)+(ESO+EDO) & (EII1 & (EMAP.EQ.1)+EII23 & (EMAP.EQ.0) & (ENBITS.GT.0)+AS3EII45 & (EMAP.EQ.0) & (ENBITS.EQ.0)))+(REM.EQ.7) & (ESO+EDO) & EII1 & (EMAP.EQ.1) & (ENBITS.GT.8) & ENBITS.NEQ.OC).

AS=SCB & I-INST(1).

The E resource bits are generated according to the following Boolean equations:

EIOV=MLV&SI+ESI&MLV+MAS&(SOV-+ADDSUB)& EII+IMO & SOV & AIDSID +(MUL+DIV)& EII+(ESOV+EDOV)-&EII&(MAS+EIMO)+(KDIV+KMUL+K-DIVP)&EII.

ER1=(RLB.EQ.1) & (SI&MLV+(MUL+-DIV) & ∧EII+SDO & ∧SC & ∧EII & MAS & STM & ∧BRG ERIMO & IMO+LXALSO & EII)+(REGN.EQ.1) & (MUL+DIV+STM-+BIT4+LB) & RAS+(BIT4+LB) & RAS & (I-INST(16-31).EQ.0)+(REN.EQ.1) & EEII & ERAS & EII1 & (I-INST(20-23).NEQ.OE).

```
ER3 = (RLB.EQ.3) & (SI & MLV + (MUL + DIV) & ∧EII + SDO & ∧SC &
      ∧EII & MAS & STM & ∧BRG ERIMO & IMO + LXALSO
&
      EII) + (REGN.EQ.3) & (MUL + DIV + STM + BIT4 +
      LB) & RAS + (REN.EQ.3) & EEII & ERAS & EII1 &
      (I-INST(20-23).NEQ.OF).
```

ES=GCS & ISI.

Description of A and E resource word equation terms:

RLB = I-INST(0-3);
REGN = I-INST(13-15;
REN = I-INST(29-31);
REM = I-INST(25-27).

See other portions of Appendix for instruction abbreviations.

The RSRC registers are loaded according to the following case statement:

```
If (SCLK & Q120 &  HOLD1 & I-EFIRST)
THEN (CASE (EOUTPTR) OF (
 RSRC0 = ERSRC,
 RSRC1 = ERSRC,
 RSRC2 = ERSRC,
 RSRC3 = ERSRC)).
```

The EOUTPTR is updated according to the following case statement:

If ($CLK & Q120 & ∧HOLD1 & I-EFIRSTX & ∧LOADP)

THEN (EOUTPTR = EOUTPTR.PLUS.1);
If ($CLK & Q120 & HOLD1 & LOADP)
THEN (EOUTPTR = 0.

The RSRC registers are cleared according to the following case statement:

```
If ($CLK & Q120 & E-DONE-R & ∧(I-EFIRST & ∧HOLD1 &
(EOUTPTR.EQ.EDONEPTR)))
THEN (CASE (EDONEPTR) OF (
RSRC0 = 0,
RSRC1 = 0,
RSRC2 = 0,
RSRC3 = 0)).
```

The EDONEPTR is updated according to the following case statement:
If ($CLK & Q120 & E-DONE-R & LOADP) THEN
(EDONEPTR = EDONEPTR.PLUS.1);
If ($CLK & Q120 & LOADP) THEN
(EDONEPTR = 0).

The LOCK and STALL signals are generated according to the following Boolean equations:
LOCK  CRACK  &
((RSRC0+RSRC1+RSRC2+RSRC3)  &
∧RSRC.NEQ.0+(RSRC0(0-20)+RSRC1(0-20)+RSRC2(0-20)+RSRC3(0-20)).NEQ.0 & (IO +IOLD+GCS  &  (GENE  &  OGC +COMM))).
STALL = STALL1 + STALLX  (external)- +EMPTY (no instruction in buffers);
STALL1 = LOCK + (LESTOP + RT6A + RT6E) & CRACK + EFULL & EINSTR & CRACK + (-STORCNT.EQ.2) & EINSTR & CRACK & ∧EC-STCOMP + STATE4 & ∧ADONE & ∧CPCK & ∧GNCK & ∧RSCK & ∧CSCK +RTV02+RTV05+RTV06+RTV12+RTV13-+RTV14+RTV16+ISTL+CRACK & (SCB & RE-DONE1-E+LAOUT+LEOUT)+(RINT-+RUN-OUT) & CRACK.

It will be obvious that many changes may be made to the apparatus and method of the present invention without departing from its teachings. For example, the resource conflict apparatus may be used in a pipelined processing unit which contains any number of stages which are capable of completing the execution of instructions with different instruction sets and shared resources.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A method for detecting the presence of resource conflicts and for enabling a resolution of such resource conflicts in a pipelined processing unit comprising a number of serially coupled pipeline stages, each stage for performing a different operation on each instruction to be executed by said processing unit, said method comprising the steps of:
   (a) storing in a number of resource registers of the first stage of said pipelined processing unit, bit indications designating those resources being utilized by the instructions currently under execution by said pipeline stages;
   (b) generating a number of sets of bit indications representative of a number of resource words for each new instruction to be processed which are coded to specify those resources required for executing said new instruction by each pipeline stage;
   (c) comparing predetermined ones of said number of sets of bit indications with said stored bit indications;
   (d) generating a signal in response to an equal comparison between any two corresponding bit indications indicating a resource conflict for inhibiting the transfer of said new instruction into one of said pipeline stages;
   (e) repeating step (c) and generating a signal when there is no equal comparison for indicating the removal of said resource conflict;
   (f) transferring said new instruction into said pipeline stages for execution in response to said signal indicating said no equal comparison in step (e); and
   (g) loading signal indications of another predetermined one of said number of sets of bit indications into a next available one of said number of said resource registers.

2. A method for detecting the presence of conflicts and for enabling a resolution of such resource conflicts in the use of resources required for executing instructions which are shared between a plurality of serially coupled stages of a pipeline processing unit, each stage for performing a different operation and each of a number of said plurality of said stages including means for completing the execution of one or more types of instructions, said method comprising the steps of:
   (a) generating a different resource word for each of said number of stages which can complete the execution of said one of said different types of instructions, each resource word containing a predetermined number of bits, each of said bits representative of a different one of said resources shared between said plurality of said stages;
   (b) storing in a first one of said number of said plurality of stages, each resource word generated for each instruction whose execution is to be completed by a last one of said number of said plurality of stages;
   (c) comparing said different resource words generated in response to each instruction received by said first one of said number of stages with said resource words stored in step (b); and,
   (d) inhibiting said first stage from transferring said each instruction into a next one of said pipeline processing unit stages when there is a comparison between any two corresponding bit indications signaling a resource conflict.

3. The method of claim 2 wherein said number of stages which can complete the execution of instructions is two and said predetermined number of bits each resource word include bits representative of resources required for both initial processing and execution of said different types of instructions.

4. The method of claim 3 wherein said execution stages are an A-unit which is the stage adjacent to said first stage and an execution unit corresponding to said last stage.

5. The method of claim 4 wherein an all ZERO resource word for said execution unit is generated in step (a) upon cracking an instruction whose execution is to be completed in said A-unit; an all ZERO resource word is generated for said A-unit in step (a) upon cracking an instruction whose execution is to be completed in said execution unit; and non ZERO resource words are generated in step (a) upon cracking an instruction which is to be partially executed by said A-unit and whose execution is to be completed by said execution unit.

6. The method of claim 3 wherein said resources include register resources used in the initial processing of said different types of instructions and indicator resources used for the execution of said different types of said instructions by said number of stages capable of executing instructions.

7. The method of claim 6 wherein said number of stages include different types of execution units and wherein said indicator resources are divided into a plurality of different classes according to use by said different types of execution units.

8. An instruction apparatus for detecting the presence of resource conflicts and for enabling a resolution of such resource conflicts in a pipelined processing unit comprising a plurality of serially coupled pipeline stages, each stage for performing a different operation on each instruction to be processed by said processing unit, said instruction apparatus comprising:

instruction crack decode means for generating a number of sets of bit indications, each set containing a predetermined number of bits representative of one of a number of resource words for each new instruction fetched by said instruction apparatus, said number of resource words being coded to specify those resources required by each of said stages capable of completing execution of instructions; and, resource control means coupled to said instruction crack decode means, said resource control means including:

a number of register means for storing a corresponding number of said resource words received from said instruction crack decode means specifying those resources being used by instructions currently under execution by said processing unit; and, comparison means coupled to said register means and to said instruction crack decode means, said comparison means for comparing each of said bit indications generated by said decode means with corresponding bit indications of said resource words stored in said register means, said comparison means generating an output lock signal in response to an equal comparison between any two corresponding bit indications for indicating a resource conflict.

9. The instruction apparatus of claim 8 wherein said instruction crack decode means includes logic circuit means responsive to said output lock signal for generating a stall signal inhibiting the transfer of said each new instruction producing said resource conflict into one of said pipeline stages for execution.

10. The instruction apparatus of claim 8 wherein said predetermined number of bits correspond to only those specific register and indicator resources which actually will produce a conflict so as to enable as many new instructions as possible to be transferred into said pipeline stages for execution.

11. The instruction apparatus of claim 8 wherein said crack decode means include means for detecting when said each new instruction is a complex instruction and generating an output signal for inhibiting the cracking of any new instruction until said complex instruction has been completed.

12. The instruction apparatus of claim 8 wherein said number of register means are connected to receive a set of bit indications corresponding to one of said number of resource words for said each new instruction to be executed by a last one of said plurality of pipeline stages, said resource control means further including first pointer means coupled to said register means and to said instruction crack decode means, said first pointer means specifying which one of said number of register means is to be loaded with said set of bit indications generated for each new instruction in the absence of said resource conflict.

13. The instruction apparatus of claim 12 wherein said crack decode means further includes means for generating a transfer signal in the absence of said resource conflict for enabling the transferring of said each new instruction into one of said pipeline stages for execution and for incrementing said first pointer means to specify a next one of said number of register means.

14. The instruction apparatus of claim 12 wherein said resource control means further includes second pointer means coupled to said register means and to said crack decode means, said second pointer means specifying which one of said register means stored the resource word corresponding to an instruction which is to be next completed, said crack decode means in response to each output signal from said last one of said pipeline stages indicating that an instruction has been completed modifying said second pointer means to point to said resource word corresponding to said instruction which is to be next completed.

15. The instruction apparatus of claim 14 wherein said resource control register means further includes means for clearing to ZERO, said one of said register means in response to said each output signal.

16. The instruction apparatus of claim 8 wherein said number of stages which can complete the execution of instructions is two and said predetermined number of bits of each resource word include bits representative of resources required for both the initial processing and execution of said different types of instructions.

17. The instruction apparatus of claim 16 wherein said execution stages are an A-unit which is the stage adjacent to said instruction apparatus stage and an execution unit corresponding to said last stage.

18. The instruction apparatus of claim 17 wherein an all ZERO resource word for said execution unit is generated by said crack and decode means upon cracking an instruction whose execution is to be completed in said A-unit; an all ZERO resource word is generated for said A-unit by said crack and decode means upon cracking an instruction whose execution is to be completed in said execution unit; and non ZERO resource words are generated by said crack and decode means upon cracking an instruction which is to be partially executed in said A-unit and whose execution is to be completed in said execution unit.

19. The instruction apparatus of claim 16 wherein said resources include register resources used in the initial processing of said different types of instructions and indicator resources used for the execution of said different types of said instructions by said number of stages capable of executing instructions.

20. The instruction apparatus of claim 19 wherein said number of stages include different types of execution units and wherein said indicator resources are divided into a plurality of different classes according to use by said different types of execution units.

* * * * *